(12) United States Patent
Maher

(10) Patent No.: US 7,577,609 B1
(45) Date of Patent: Aug. 18, 2009

(54) METHOD AND APPARATUS USING DIGITAL CREDENTIALS AND OTHER ELECTRONIC CERTIFICATES FOR ELECTRONIC TRANSACTIONS

(75) Inventor: David P. Maher, Ponte Vedra Beach, FL (US)

(73) Assignee: AT&T Intellectual Property II, L.P., Reno, NV (US)

( * ) Notice: Subject to any disclaimer, the term of this patent is extended or adjusted under 35 U.S.C. 154(b) by 329 days.

(21) Appl. No.: 11/326,067

(22) Filed: Jan. 5, 2006

Related U.S. Application Data

(63) Continuation of application No. 09/521,685, filed on Mar. 9, 2000, now Pat. No. 7,043,441, which is a continuation of application No. 09/107,785, filed on Jun. 30, 1998, now Pat. No. 6,125,349.

(60) Provisional application No. 60/060,643, filed on Oct. 1, 1997.

(51) Int. Cl.
*G06Q 40/00* (2006.01)
*G06Q 20/00* (2006.01)
*G06F 21/00* (2006.01)

(52) U.S. Cl. .................... 705/39; 705/40; 705/44; 705/53; 705/56; 705/76

(58) Field of Classification Search .............. 705/40, 705/44, 53, 56, 76, 39
See application file for complete search history.

(56) References Cited

U.S. PATENT DOCUMENTS

| | | | | |
|---|---|---|---|---|
| 5,623,547 A * | 4/1997 | Jones et al. | ................... | 705/68 |
| 5,659,616 A * | 8/1997 | Sudia | ........................ | 705/76 |
| 5,671,279 A * | 9/1997 | Elgamal | ...................... | 705/79 |
| 5,677,955 A * | 10/1997 | Doggett et al. | ................ | 705/76 |
| 5,692,132 A * | 11/1997 | Hogan | ......................... | 705/27 |
| 5,715,314 A * | 2/1998 | Payne et al. | ................... | 705/78 |
| 5,717,989 A * | 2/1998 | Tozzoli et al. | ................. | 705/37 |
| 5,732,400 A * | 3/1998 | Mandler et al. | ................ | 705/26 |
| 5,761,648 A * | 6/1998 | Golden et al. | ................. | 705/14 |
| 5,768,385 A * | 6/1998 | Simon | ........................ | 705/69 |
| 5,790,677 A * | 8/1998 | Fox et al. | ...................... | 705/78 |
| 5,850,442 A * | 12/1998 | Muftic | ........................ | 705/65 |
| 5,862,325 A * | 1/1999 | Reed et al. | ................... | 709/201 |
| 5,903,882 A * | 5/1999 | Asay et al. | .................... | 705/44 |
| 5,915,022 A * | 6/1999 | Robinson et al. | .............. | 705/75 |
| 5,987,140 A * | 11/1999 | Rowney et al. | ............... | 705/79 |
| 6,070,150 A * | 5/2000 | Remington et al. | ........... | 705/34 |
| 6,138,107 A * | 10/2000 | Elgamal | ...................... | 705/39 |
| 6,477,513 B1 * | 11/2002 | Walker et al. | ................. | 705/76 |
| 7,003,480 B2 * | 2/2006 | Fox et al. | ...................... | 705/26 |

* cited by examiner

*Primary Examiner*—James P Trammell
*Assistant Examiner*—Scott S Trotter

(57) ABSTRACT

A method for performing electronic transactions, comprising receiving a long-term certificate, authenticating a user associated with the long-term certificate, and then sending a short-term certificate to the authenticated user. In addition, risk associated with the user can be evaluated, and this risk information, as well as other information, can be included in the short-term certificate.

14 Claims, 2 Drawing Sheets

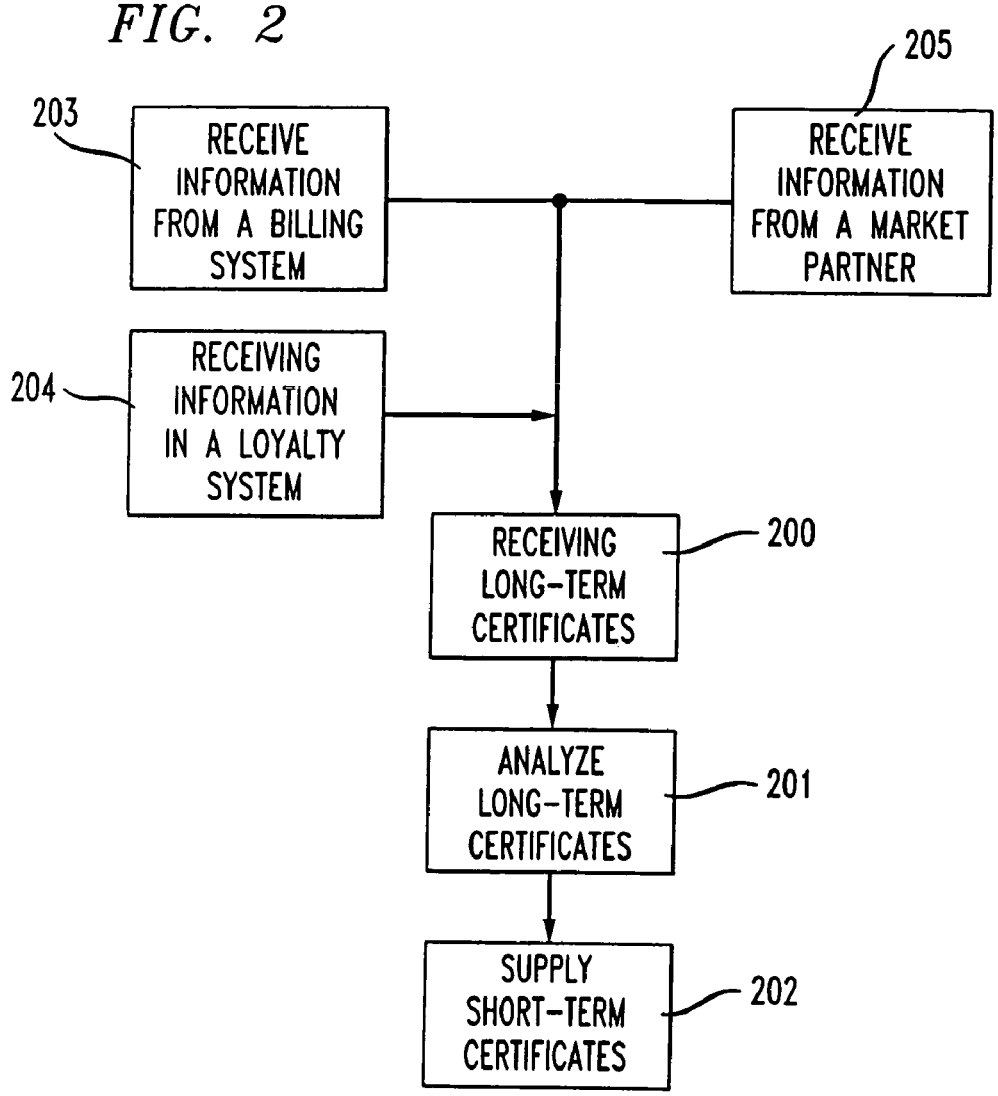
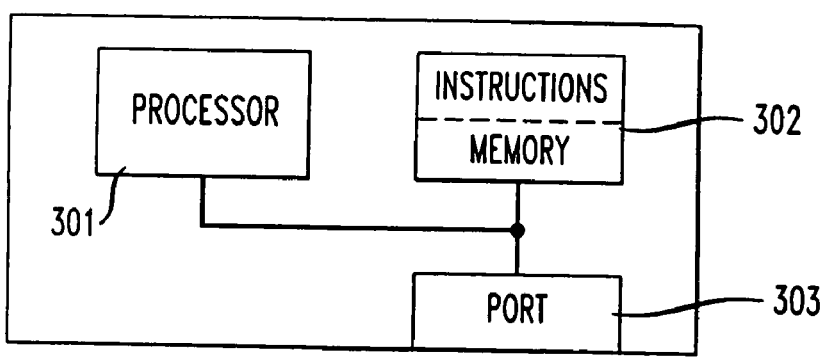

METHOD AND APPARATUS USING DIGITAL CREDENTIALS AND OTHER ELECTRONIC CERTIFICATES FOR ELECTRONIC TRANSACTIONS

CROSS-REFERENCE TO RELATED APPLICATIONS

This is a continuation of patent application Ser. No. 09/521,685 filed Mar. 9, 2000, now U.S. Pat. No. 7,043,441 which was a continuation of patent application Ser. No. 09/107,785 filed Jun. 30, 1998, now U.S. Pat. No. 6,125,349 issued Sep. 26, 2000 which claimed priority to provisional application Ser. No. 60/060,643, filed on Oct. 1, 1997.

FIELD OF THE INVENTION

The present invention relates to digital credentials and other electronic certificates. More particularly, the present invention relates to a service for using digital credentials and other electronic certificates to practice commerce on a network.

BACKGROUND OF THE INVENTION

To exercise certain rights and privileges, people need to possess or show various types of credentials. Credentials are certificates such as birth certificates, Social Security Cards, driver's licenses, membership cards, admission badges charge cards, and the like that represent some certified assertion about a person. In the case of a driver's license, an officer of the state certifies that a specific person is licensed to drive a vehicle. A charge card represents an assertion, certified by some bank or other organization, that a person has a charge account at that bank. Companies issue credentials for their employees, usually in the form of ID badges. Generally, the certificate will include some means of identifying to whom the assertion applies (the holder or subject of the credential), and who is certifying the assertion (the certifier of the credential, who is often the issuer).

In the case of a driver's license or corporate ID, the holder is typically identified by a photograph and signature specimen laminated to the certificate and the certifier of the credential is usually identified by a logo, layout, and some other means such as a hologram.

With the advent of electronic commerce, standard credentials have become insufficient, and the need for digital credentials has become more widespread. Digital credentials are electronic certificates having the property that the assertions about the holder can be interpreted and verified by a computer, the certifier can be reliably recognized by a computer, and the holder's present intention to use the credentials can be recognized by a computer (often remotely, through a network). Digital credentials can use a cryptographic mechanism known as a digital signature. An electronic document can be signed by applying a cryptographic secret key controlled by the signer. A signature can be verified using public information (known as the public key). The verification process can use the public key to verify that the signer's secret key was used to sign the document. The science of public key cryptography enables this.

Examples of digital credentials are automatic teller machine (ATM) or bank cards. As opposed to other types of certificates mentioned earlier, these are not usually presented to people for verification. They are normally presented to an ATM and ultimately to a specialized computer network. The relevant information regarding the certifier is digitally encoded on a magnetic strip and the cardholder is identified by a Personal Identity Number or PIN. Furthermore, the holder's present intention to apply the rights asserted by the credential (such as withdrawing money) is signified by the holder's entry of the PIN. This ATM card allows the holder to use electronic banking over specialized digital networks. The present form of digital credentials, however, can support only a minimal variety of services over specialized and non-specialized networks such as the Internet.

Present ways of using digital credentials (using PINs and passwords) are notoriously insecure, very user-unfriendly, and generally inadequate for electronic commerce. For example, while hand-written signatures on documents can make paper records auditable, PINs and passwords are not very useful for this purpose. In particular, they do not have persistent properties as signatures do. For example, one can directly verify a signature post-hoc, but PINs and passwords can be verified only at time of use. The certified digital signature can substitute for a hand-written signature.

The importance of digital credentials is rapidly increasing because networks are becoming more open and public. Whereas a person's identity on a closed network is known through a network operating system, and privileges can be determined by database look-ups, such is not the case on the Internet, for example.

Digitally-signed certificates have been used in electronic payment systems that have arisen over the past five years or so. At least three distinct types of payment systems exist, each of which differs from the current invention in significant ways. The three systems are referred to as e-check, e-charge, and e-cash.

An e-check is designed to function in a way similar to the way paper checks function. While a paper check is a signed request for a bank to pay a given amount from the payer's account to the party that is named on the check (the payee), an e-check is a message requesting the same procedure, but it is electronically signed by the payer. The electronic signature certifies, as in the case of a paper check that the user attests to the payment request and to the specifics of the payee and the amount. With a paper check, the payee has the option of verifying the identity of the payer in person, often demanding one or more alternate methods of payer identification, or the payee can sometimes wait until the check "clears" before providing value in return for the check. Clearing means that the payee's bank receives payment from the payer's bank. With an e-check system, the payee can also wait until the check clears from the payer's bank, or the payee can accept the legitimacy of the payer's digital signature by checking the certificate that the payer's bank issues to the payer which certifies the payer's signing key. In the latter case, the payee risks the possibility that the digital signature certificate has been revoked. This risk is reduced when the payee checks an electronic "Certificate Revocation List" or CRL. Nonetheless, the residual risk exists that the CRL is not up to date. Additionally, the traditional risk exists that the payer's account may have insufficient funds, and the e-check will not clear.

E-checks use the same clearing system and clearing networks used by paper checks. The systems and networks are relatively expensive to use, and when one adds the cost of administering CRLs and the cost of processing e-checks returned for insufficient funds, the use of e-checks for relatively small payments of a few dollars or less is not cost effective. In the present invention, these inefficiencies are addressed by reducing the dependency on CRLs, and by use of a novel approach to risk management, integrating risk management parameters directly into a certificate.

Another use of digital certificates in payment systems is illustrated by the Secure Electronic Transaction ("SET") standard that has been proposed by MasterCard and Visa SET describes a relatively complex mechanism for making a payment using certificates within the current credit card payment support infrastructure. A number of parties exist in SET: the cardholder, the payee (or merchant), the issuing bank, the acquirer (or merchant's bank), the payment gateway, and optionally, "third parties" that represent one or more of the financial institutions involved. In SET, five different parties have certificates. Cardholder certificates function as an electronic representation of the payment card. Merchant certificates function as an electronic substitute for the payment brand decal that appears in a store window. Payment Gateway certificates are used by Acquirer's or their processors for the systems that process authorization and capture messages. In addition, Acquirer certificates and Issuer certificates aid in the distribution of Merchant and Issuer certificates, respectively. In general, the various certificates are used to support cryptographic keys that are used to provide credit card transaction messages with security properties such as privacy and authenticity.

SET is, overall, an elaborate scheme that is described in the "SET Secure Electronic Payment Transaction Specification" published by MasterCard and Visa. The certificates involved in SET may need to be revoked for any of a number of reasons such as key compromise, or change of status of the party holding the certificate. In contrast to the present invention, the scheme requires a certificate hierarchy, on-line verification procedures, and a certificate revocation infrastructure. Transactions require a significant amount of computation by multiple parties to complete.

Another use of digital certificates in payment systems is illustrated in electronic cash (e-cash) systems where cash is either represented by digital bearer certificates or by "value registers" in smart cards. In the case of digital bearer certificates, a digital signature is applied to an assertion that the certificate may be redeemed for a certain amount of cash at a certain bank or financial institution. A bank will issue certificates that can be used to verify the authenticity of the signature on the bearer certificate. Because digital bearer certificates can be freely copied, a risk exists that users will attempt to repeatedly use the same certificate. Therefore, risk management measures must be employed to ensure that each certificate is spent precisely once. Typically, either a smart card is used to contain the certificates and to participate in a two party protocol that marks certificates as used, or a network-based mechanism may be employed that records each certificate as it is used, and allows any payee to see if the certificate tendered is being used for the first time.

In the case of value registers in smart cards, certificates are used to certify the keys used to verify the digital signatures on messages that are exchanged between two software applications running on the smart cards. For example, a payer's smart card debits its value register (or current cash balance), and signs and sends a message affirming the act to the payee. The payee, upon receiving the message affirming the debit can check the signature on the certificate and verify the signature on the message.

Multiple risks exist in this system as well. In particular, the credit and debit operations must be encapsulated within smart cards or some other physically secure containers that must be distributed and maintained. In addition, should the certificates be compromised, counterfeit e-cash can be produced that is indistinguishable from e-cash that is issued by a legitimate originator. Should the physical container of a card be compromised, then clones of that card could be created that never debit their balances but nonetheless dispense e-cash acceptable to other cards. These are called "golden goose" cards. Thus, this type of e-cash, as a payment system, requires significant risk management measures. Another difficulty associated with this payment scheme has to do with recovery from errors. A communication error can literally destroy value. For example, if one smart card sends a signed message "I have debited my value register by $20" to another smart card, yet the second smart card does not receive that message intact, no credit will be offset to the debit. A support structure to make amends for these type of errors is required.

The shortcomings with the prior art involve the difficulty in using credentials that have been distributed electronically in a highly distributed system that lacks a reasonable means to revoke or update the credentials. For example, assume one holds a digital credential that authorizes the holder to purchase goods up to a value of one hundred thousand dollars (e.g., a corporate credit card). To use this credential, one must go to a central database to re-verify each time the credential is used.

Within the known systems, risk management measures are required to properly support payment systems, and defend them against fraud. Yet the known systems do not contain an efficient way in which risk management is integrated into the payment system.

SUMMARY OF THE INVENTION

The present invention relates to a method and apparatus for using digital credentials, or certificates to facilitate commerce on a network. In one embodiment of this invention, a party wishing to act as guarantor of a transaction would receive long-term certificates from a consumer after the consumer logs into the network. The guarantor analyzes the long-term certificates, at least to verify the identity of the consumer. The guarantor, after being satisfied with the information presented, supplies short-term certificates containing assertions based on information from the above analyses. The short-term certificates can then be used to purchase goods from participating merchants on a network.

In another embodiment, merchants use the short-term certificates to verify terms and conditions under which a given consumer can be billed through the guarantor. The short-term certificates also certify the cryptographic public keys of consumers that are used to digitally sign statements requesting merchants to bill for goods and services purchased through the guarantor. Billing records associated with purchases are forwarded to the guarantor or his agent, whereby the records are sorted by consumer identity and used to construct periodic statements containing many billing records that are made available to consumers who can make a single payment. Detailed information about the purchases is thus provided to the guarantor who then helps merchants market goods accordingly. The billing records may contain digitally signed statements by consumers directing the merchant to bill through the guarantor.

BRIEF DESCRIPTION OF THE DRAWINGS

FIG. 2 is a flow chart of an embodiment of a method of the present invention.

FIG. 3 illustrates an embodiment of an apparatus and system in accordance with the present invention.

DETAILED DESCRIPTION

Figure 1:
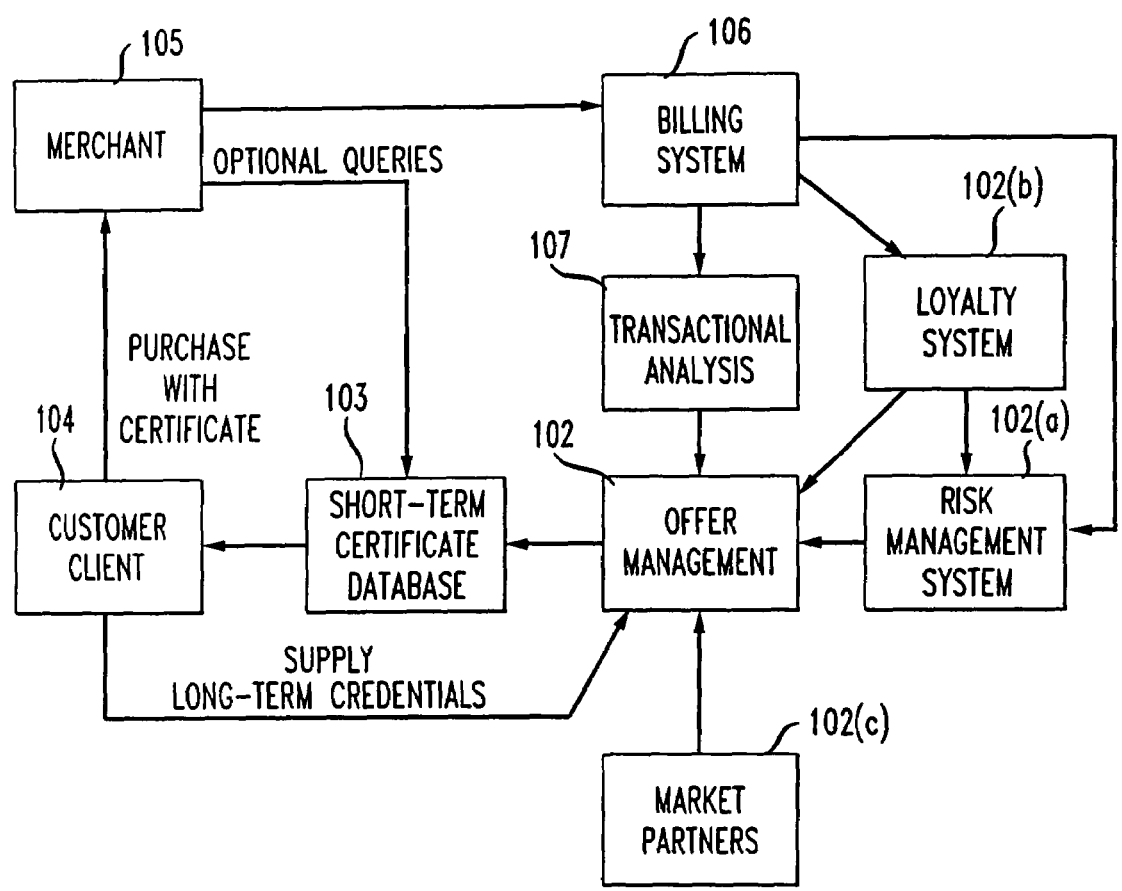
FIG. 1 illustrates a system-level block diagram of an embodiment of the present invention.

The present invention is directed to ways of using digital credentials and other electronic certificates to practice commerce over a network. The purpose is to run a relatively convenient and efficient system using a combination of both long-term and short-term certificates.

Long-term certificates, as defined here, are certificates that contain information or make an assertion that is not expected to change over some long period of time. For example, long-term certificates can be used to represent a person's identity. Revocation of long-term certificates is not necessary on any large scale because the information contained in long-term certificates is relatively static and benign.

Short-term certificates, on the other hand, hold information or make assertions that may rapidly change, and therefore are designed to expire after some relatively short period of time. For example, short-term certificates may contain information about a person's credit history, shopping history, or information about the short-term certificate's maximum value as currency. Short-term certificates may make assertions about what a person is authorized to do, or about agreements that they may have with other parties.

The validity of the short-term credentials can be based on an individual's identity. For example, when a person logs into a system, the person uses some means to verify identity (using long-term credentials, for example), and then the system supplies short-term credentials which say, for example, that the client is authorized to charge for commerce on the world wide web for purchases the amount of which is not to exceed some fixed amount. Typically the short-term credential can also certify cryptographic keys that can be used for digital signatures that affirm a person's agreement with a contract. In addition, the short-term credential might contain the semantics attributed to the use of the person's digital signature as well as statements of limitations of liability.

Referring now in detail to the drawings, FIG. 1 illustrates a system-level embodiment of the present invention. In this system, Customer Client 104 desires to purchase goods or services from Merchant 105. To do this, Customer Client 104 needs to present to Merchant 105 a form of payment that will be accepted by Merchant 105. In anticipation of this, Client 104 may present a long-term certificate to a certifier to access a certificate of payment called a short-term certificate.

The long-term certificate can be certified through known encryption techniques. The certifier is typically, for example, an internet service provider, bank, or any entity designed to certify credentials. The long-term certificate contains, at the very least, information that verifies the identity of Customer Client 104. The long-term certificate may contain other information desired by the certifier. Once the certifier is satisfied by Customer Client 104's long-term certificate information, the certifier sends Customer Client 104 one or more short-term certificates from the short-term certificate database 103.

Short-term certificates are digital in form, and contain information stating, at least, that the certifier guaranties payment up to a certain amount of value. In addition, the short-term certificate can contain marketing information. For example, a short-term certificate can tell a participating merchant that goods and services may be charged by the client named in the certificate to a specific account, through an agreed-upon channel, for up to the amount of $20. In addition, the short-term certificate may contain information that instructs Merchant 105 to apply a 20% discount to the cost of the goods supplied to the bearer of this short-term certificate. Upon receiving a short-term certificate, Merchant 105 can send an optional query to the short-term database for various reasons such as double-checking the certificate's validity in the case when the purchase amount exceeds some threshold stated in the short-term certificate. The short-term certificates are short term in the sense that they contain information or make assertions based on information that may change over a relatively short period of time. They therefore can be set to expire in some short period of time. For example, a certifier may supply a short-term certificate to Customer Client 104 that guaranties that the Client can charge to an account the purchase of any item that costs up to $20, but can only be used within 24 hours after Customer Client 104 receives this certificate.

Merchant 105 and Customer Client 104 consummate a transaction by promising (on the part of Merchant 105) to supply goods or services in exchange for an affirmative indication on the part of the Client that the goods or services can be charged to a billing account maintained in Billing System 106 according to and limited by the information provided by a short-term certificate. Once the short-term certificate is received, and the transaction is completed, the short-term certificate is sent along with an electronic record of a bill of sale through agreed-upon channels for payment from the certifier, or guarantor.

The above-mentioned agreed-upon channels, called Billing System 106, collect billing records, and their corresponding short-term certificates and renders them for payment. In addition to serving as a conduit for payment, the billing system may supply information to various subsystems that serve to analyze information about the transaction. The Transaction Analysis 107 collects details of the transaction. The Transaction Analysis 107 correlates different types of purchases with different demographics of this particular Customer Client 104, and then determines what offers might be made to this particular consumer. The purpose of the transaction analysis is to determine patterns of consumer behavior so that some action may be taken. For example, Customer Client 104 might show a pattern of behavior that would alert the certifier that Customer Client 104 is in the market for an automobile. In other words, transactional information is used to better match marketing with consumer-behavior information.

Once the transactional analysis is complete, the results are used in Offer Management 102 to market goods or services to Customer Client 104, possibly by attaching offers to short-term certificates in Short-Term-Certificate Database 103. In this way, a type of high-gain feedback loop is completed, as can be seen in FIG. 1.

In FIG. 1, Offer Management 102 can use information received by Risk Management System 102(a), Loyalty System 102(b), and Market Partners 102(c) to determine what, if any, information should go into the short-term certificates along with any assertions that might be made about terms and conditions, credit limits, discounts, etc. Risk Management System 102(a) can receive information from Billing System 106, thereby keeping data on a particular Customer Client's usage patterns. Risk Management System 106 can then analyze the information supplied by Billing System 106, and alert the certifier as to how much risk should be taken with regard to a particular Customer Client. For example, Risk Management System 102(a) can alert the certifier to change the credit limit, either up or down, for a particular Customer Client. The system also can determine whether or not the recent usage patterns of a person are indicative of fraud or other misuse (that may have resulted from a key management compromise whereby a consumer's identity certificate and secret key have been compromised). This information passed between Billing System 106, Risk Management System 102(*a*), and the certifier can be updated and analyzed arbitrarily quickly, possibly on a daily basis. This rapid response obviates the need for use of certificate revocation lists.

Billing System 106 can also supply information to Loyalty System 102(*b*). Loyalty System 102(*b*) is a system whereby consumers are rewarded for regular use of a particular merchant. An example of a loyalty system is found in frequent-flier programs. Loyalty System 102(*b*) can collect and analyze information, and then supply this information to the certifier's Offer Management 102 so the certifier can tailor its marketing through Offer Management 102 accordingly. In particular, the Offer Management process can author assertions to be inserted into the short-term certificates that declare that loyalty points are available to pay for purchases from participating merchants. Such a merchant can thus accept payment ostensibly in loyalty points, but the merchant can be remunerated through the billing system in cash or other consideration upon presentment of a certificate-backed, signed purchase agreement. This system offers an advantage over other loyalty systems because one purpose of a loyalty system is to reinforce good behavior by rewarding the user, and this system can reward the user arbitrarily rapidly.

Market Partners 102(*c*) can enter into agreements with certifiers to help the certifier tailor its marketing through Offer Management 102. The idea is to capture the value of transactional information without severely impacting the consumer's privacy. Market Partner 102(*c*) provide information to the system about what Market Partner 102(*c*) desires in a consumer. This information might be a demographic profile, a consumer-behavior profile, etc. For example, Market Partner 102(*c*) can tell the certifier that it wishes to target people who are shopping for new cars. Offer Management 102 then correlates the needs of Market Partner 102(*c*) with the information it contains about the consumer.

FIG. 2 is a flow chart of a process in accordance with an embodiment of the present invention. In its most basic form, long-term certificates, or some other proof of identity are received by the certifier at step 200. At step 201, the certifier then analyzes the information presented in the long-term certificate and then, at step 202, supplies, from a short-term-certificate database, short-term certificates that can be used as instruments to purchase goods from merchants on the network.

In addition to receiving long-term certificates, the certifier may receive, at step 203 information from a billing system, at step 204 information from a market partner, and at step 205 information from a loyalty system.

The short-term certificate can contain a maximum value for which certifier will act as guarantor upon presentment by a merchant. In addition, the short-term certificate can contain information about offers to the consumer, incentive programs, or loyalty programs.

As stated above, various subsystems, such as a risk management system, a loyalty system, or a marketing system can be interposed between the certifier and the merchant. The short-term certificate can contain information reflecting, for example, the risk-management analysis with regard to a consumer, the loyalty-system analysis with regard to a consumer, or the marketing analysis with regard to the consumer. For example, the short-term certificate can contain a limit on the certificate's guaranty limits based on the risk-management analysis; the certificate can contain a number of acquired consumer points based on the loyalty-system analysis; and the certificate can contain offers (including incentives) to the consumer based on the marketing analysis.

When a consumer desires to make a purchase from a participating merchant, he or she presents through the network one or more short-term certificates. The merchant can analyze the short-term certificate, and determine any guarantees of payment, any rights to use alternative methods of payment such as loyalty points, any discounts or other entitlements, and then make appropriate adjustments to the consumer's bill of sale. The merchant's final price, terms, and conditions for a sale as part of a bill-of-sale, are forwarded to the consumer, who will indicate acceptance, and make the purchase through some affirmative act (that may be required by a condition stated in the short-term certificate) such as signing the bill of sale with a digital signature whose verification key is certified by the short-term certificate.

Ultimately, the merchant can collect for the goods or services furnished by creating a billing record containing references to the bill of sale and the short-term certificate obtained from the user, and forwarding this billing record through a regular billing channel to the certifier. The certifier can then collect all billing records associated with a specific user and present them to the user in a statement. For example, if the certifier is a telephone company, the telephone company can bill the user for amounts as stated in the short-term certificate by using the user's regular monthly telephone bill.

FIG. 3 shows an embodiment of an apparatus in accordance with the present invention. The apparatus includes processor 301, memory 302 that stores instructions adapted to be executed by processor 301, and port 303 adapted to be connected to a network, with both port 303 and memory 302 coupled to processor 301. Memory includes any medium capable of storing instructions adapted to be executed by a processor. Some examples of such media include, but are not limited to, floppy disks, CDROM, magnetic tape, semiconductor memory, hard drives, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

In one embodiment of the present invention, memory 302 stores instructions adapted to be run on processor 301, to receive information, analyze that information, and then supply short-term certificates the character of which depends on the results of the analysis. The information received and analyzed can come from market partners, a billing system, a loyalty system, and from long-term certificates supplied by a consumer.

As explained in detail above the invention increases efficiency and productivity of commerce on a network. By using digital credentials and other digital certificates, micro-billing becomes more feasible by decreasing transaction costs, limiting risk, and allowing for easily updated credentials.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A method performed by a computer system on behalf of a guarantor of payment for purchases, the method comprising the computer system receiving from a user a request to send to said user at least one certificate, said request containing at least information that verifies the identity of said user, the computer system, responsive to said request, and upon authenticating said user, determining a maximum amount and a period of time during which said guarantor is willing to guarantee payment for purchases by said user, the computer system sending to said user a certificate guaranteeing payment up to said maximum amount for a purchase by said user from a supplier in a transaction carried out over a network, so that said user is enabled to enter into said transaction using said certificate as a form of payment that will be accepted by said supplier, said certificate including expiration information corresponding to said period of time, the computer system receiving said certificate and an electronic record of said transaction from said supplier, said electronic record including at least the type of said purchase and the price, the computer system, after receiving said certificate and said electronic record of said transaction from said supplier, making payment to said supplier for said purchase a) without having received from said supplier any request for assurance relative to said certificate or relative to said guarantor's guarantee to make said payment, and b) without providing any such assurance to said supplier, and the computer system, after receiving said certificate and said electronic record of said transaction from said supplier, billing said user for the amount of said purchase in a billing statement that indicates at least said type of said purchase and said price, the computer system including one or more processors.

2. The method of claim 1 wherein said certificate further includes an assertion of at least one entitlement for said user in addition to the ability to use said certificate to pay for purchases.

3. The method of claim 1 wherein said certificate further includes an indication that said user is entitled to a discount to the cost of said purchase.

4. The method of claim 1 wherein said certificate further includes an indication that said user is entitled to use a form of payment other than money.

5. The method of claim 1 wherein said certificate further includes an indication that said user is entitled to use loyalty points to pay for said purchase.

6. The method of claim 1 wherein said certificate further includes at least one marketing offer from at least one market partner of said guarantor.

7. The method of claim 6 wherein said at least one marketing offer is a discount to the cost of said purchase.

8. The method of claim 6 wherein said at least one marketing offer is loyalty points to pay for said purchase.

9. The method of claim 1 wherein said electronic record includes a bill of sale that includes at least said type of said purchase and said price.

10. A method performed by a computer on behalf of supplier of goods or services, the method comprising the computer receiving a certificate from a customer, said certificate specifying a maximum amount and information indicative of a period of time during which a guarantor is willing to guarantee payment for purchases by said customer, the computer consummating a purchase transaction with said customer, goods or services over a network including acceptance of said certificate as payment for the purchase without seeking any assurances relative to said certificate or relative to said guarantor's guarantee to make said payment, other than any assurances contained in said certificate itself, and the computer sending said certificate and an electronic record of said transaction to a billing system for payment from said guarantor, said electronic record including at least the type of said purchase and the price.

11. The method of claim 10 wherein certificate further includes an indication that said customer is entitled to a discount to the cost of the purchase, wherein said consummating the purchase transaction includes charging the discounted cost to said customer.

12. The method of claim 10 wherein said certificate further includes an indication that said customer is entitled to use loyalty points to pay for the purchase, wherein said consummating the purchase transaction includes accepting said loyalty points in payment for said purchase, and wherein said payment from said guarantor includes cash remuneration.

13. The method of claim 10 wherein said certificate accepted by said supplier had been received by said customer from said guarantor in response to a long-term certificate that had been sent from said customer to said guarantor, said long-term certificate having contained at least information verifying the identity of said customer.

14. The method of claim 10 wherein said electronic record includes a bill of sale that includes at least said type of said purchase and said price.

* * * * *